United States Patent [19]

Sano et al.

[11] Patent Number: 5,664,763
[45] Date of Patent: Sep. 9, 1997

[54] APPARATUS FOR BLOWING CABLE AND METHOD THEREFOR

[75] Inventors: Hiroaki Sano; Satoshi Tanaka; Kinji Taguchi, all of Kanagawa, Japan

[73] Assignee: Sumitomo Electric Industries, Ltd., Osaka, Japan

[21] Appl. No.: 540,830

[22] Filed: Oct. 11, 1995

[30] Foreign Application Priority Data

Oct. 14, 1994 [JP] Japan ................... 6-249273

[51] Int. Cl.$^6$ ............................................. B65H 59/00
[52] U.S. Cl. ................................................... 254/134.4
[58] Field of Search ................ 254/134.3 R, 134.3 FT, 254/134.4, 268; 226/25, 43, 178

[56] References Cited

U.S. PATENT DOCUMENTS

| | | |
|---|---|---|
| 4,691,896 | 9/1987 | Reeve et al. . |
| 4,796,970 | 1/1989 | Reeve et al. . |
| 4,856,760 | 8/1989 | Frost et al. ............... 254/134.4 |

FOREIGN PATENT DOCUMENTS 0 253 636   1/1988   European Pat. Off. .

*Primary Examiner*—Robert C. Watson
*Attorney, Agent, or Firm*—Cushman Darby & Cushman IP Group of Pillsbury Madison & Sutro LLP

[57] ABSTRACT

An apparatus of the present invention for blowing a cable has a meandering detection section provided adjacent to a feeding rollers. The meandering detection section includes a straight passage for the cable passing therethrough, a recessed portion being arranged on a wall of the passage, and a detector detecting the cable meanderingly entering into the recessed portion. When there is no entering of the cable into the recessed portion, the cable is in the normal insertion condition. On the other hand, when the cable meanders at a short pitch entering deep into the recessed portion, the detector detects the abnormality of the insertion, and the feed speed is controlled to cancel the meandering of the cable.

8 Claims, 4 Drawing Sheets

APPARATUS FOR BLOWING CABLE AND METHOD THEREFOR

BACKGROUND OF THE INVENTION

1. Field of the Invention

The present invention relates to an apparatus for blowing a fragile cable such as an optical fiber or a bundle of optical fibers to insert into a tube while riding on air flow, and a method therefor.

2. Description of the Related Art

There is a method in which a cable is inserted into a tube by air flow with the cable being fed into the tube while air flow being introduced simultaneously with the feeding. In this case, the feeding of the cable into the tube at a speed higher than a cable insertion speed by air flow requires a longer insertion time, because insertion resistance is increased due to the meandering of the cable within the tube. If the cable meanders and such meandering is aggravated, the insertion of the cable is no longer possible.

EP 0 253 636 has proposed a method and apparatus to overcome this problem. In this method and apparatus, the thrust of a cable is controlled by arranging a curved section on a part of the passage and detecting the displacing of the cable toward the outer curve of the curved section at the curved section so that the application of such a force as to buckle the cable is detected.

Abnormality in cables detected by such conventional method and apparatus will be described with reference to FIGS. 5A and 5B. In FIGS. 5A and 5B, reference numeral 1 represents a cable; and 16, an abnormality detecting tube. FIG. 5A shows a normally inserted condition of a cable, in which the speed at which the cable is inserted by air flow is higher than the speed at which the cable is fed. Under this condition, the cable 1 passes along the inner curve of the abnormality detecting tube 16 as a passage. Under an abnormal condition, the speed at which the cable is inserted by air flow is lower than the speed at which the cable is fed, so that the cable moves while passing along the outer curve of the abnormality detecting tube 16 as a passage as shown in FIG. 5B.

However, under the condition in which the cable 1 is only moved toward the outer curve, the cable 1 is merely curved so as to depict a mild curve along the abnormality detecting tube 16, and this mild curve is not such as to mechanically damage the cable 1. If the feed speed is controlled to be reduced at this instance, the insertion speed is reduced more than necessary, which hence imposes the problem of increasing the total insertion time.

Namely, the curve of the cable is allowed to some degree in which the cable is not damaged. However, the conventional method and apparatus as disclosed in EP 0 253 636 does not allow such a curve.

Moreover, in a method of using the curved section for detecting abnormality, the cable 1 is inevitably worn while coming in contact with the wall surface of the abnormality detecting tube 16, thus producing resistance. Therefore, part of the insertion force is lost, which is a disadvantage.

SUMMARY OF THE INVENTION

It is an object of the present invention to provide an apparatus for blowing a cable by an air flow and a method therefor which are capable of detecting only the meandering of a cable and are free from giving resistance that is useless in inserting the cable.

The apparatus of the present invention for blowing a cable is comprised of: feeding rollers which feed a cable into a tube; a meandering detection section provided adjacent to the feeding rollers, the meandering detection section having a straight passage for the cable passing therethrough, a recessed portion being arranged on a wall of the passage, and a detector which detects the cable meanderingly entering into the recessed portion; an air flow supplying section which supplies an air flow into the passage and the tube; and a sealing member which prevents the leak of the air flow from the apparatus.

According to the invention, the detector gives no influence on the insertion resistance of the cable.

BRIEF DESCRIPTION OF THE DRAWINGS

In the accompanying drawings.

DETAILED DESCRIPTION OF THE INVENTION

The detailed description of the present invention will be described referring to the accompanying drawings.

Figure 3A:
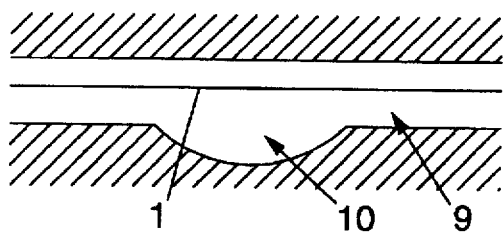
FIGS. 3A to 3E are diagrams illustrative of the operation of a recessed portion of the present invention.
Figure 3B:
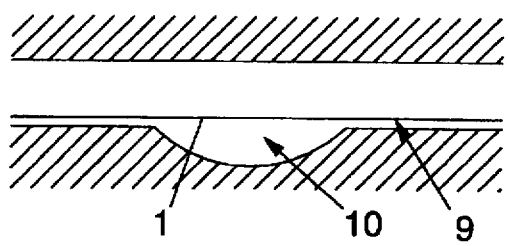
Figure 3C:
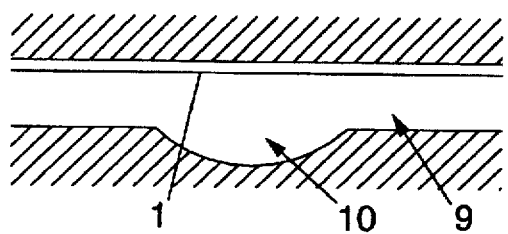

An exemplary recessed portion and a cable advancing condition in the invention will be described with reference to FIGS. 3A to 3E. In FIGS. 3A to 3E, reference numeral 1 represents a cable; 9, a passage; and 10, a recessed portion. FIGS. 3A, 3B, and 3C show conditions in which the cable 1 passes through the passage 9 straight. The cable 1 passes normally in the following cases: the case where the cable 1 passes through the middle of the passage 9 as shown in FIG. 3A; the case where the cable 1 passes through the passage 9 so as to come in contact with the recessed portion 10 side as shown in FIG. 3B; and the case where the cable 1 passes through the passage 9 so as to come in contact with a wall surface side remote from the recessed portion 10 as shown in FIG. 3C.

Figure 3D:
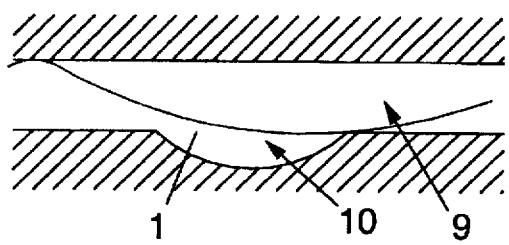
Figure 3E:
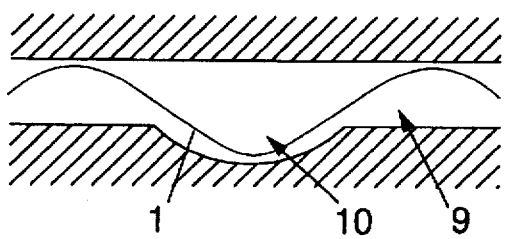

In the case where the cable 1 meanders at such a long pitch as not to be damaged as shown in FIG. 3D, the cable 1 is supported either by the edge portions of both ends or by the edge portion of a single end of the recessed portion 10, so that the cable 1 does not enter into the recessed portion 10. Therefore, the cable 1 in this case is not detected by a not shown detector that is designed to detect a cable 1 that enters into the recessed portion 10 meanderingly, and is judged to be normally inserted. In the case where the cable 1 meanders at a short pitch as shown in FIG. 3E, the cable 1 does enter deep into the recessed portion 10, which allows the detector to detect an abnormality. The detecting of the abnormality leads to controlling the feed speed to rectify the meandering.

Figure 4:
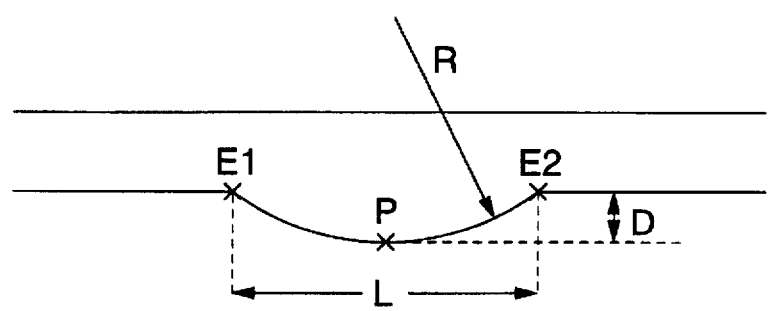
FIG. 4 is a diagram illustrative of a recessed portion of the present invention.
Figure 5A:
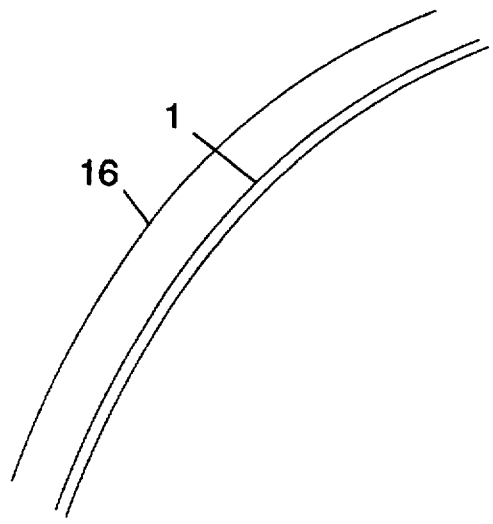
FIGS. 5A and 5B are diagrams illustrative of the operation of a conventional example.
Figure 5B:
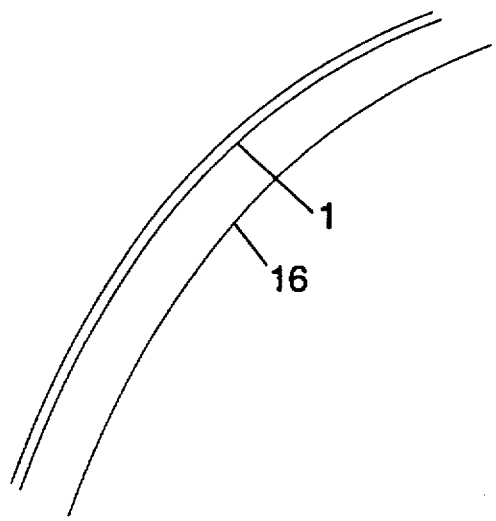

Therefore, in the present invention, a meandering pitch to be detected as abnormal can be selected as detection sensitivity by adjusting the length and depth of the recessed portion as shown in FIG. 4. That is, it is assumed that the cross section of the recessed portion is arcuate for reasons of convenience. If it is assumed that the distance between edges E1, E2 of the recessed portion is L and that the depth of a detecting point P at the lowermost position of the recessed portion is D, then the radius of curvature of a cable coinciding with the arc is given as $$R=((L^2/4)+D^2)/2D$$

Therefore, R can be determined by L and D.

Figure 1:
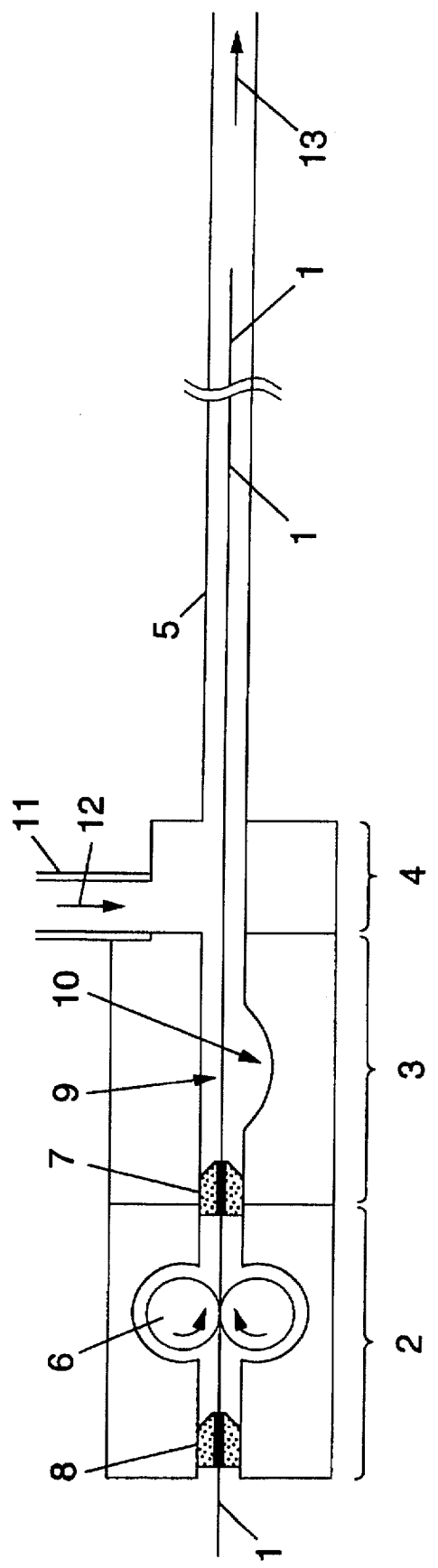
FIG. 1 is a diagram schematically showing the construction of an apparatus for blowing a cables of the present invention.

FIG. 1 is a diagram schematically showing the construction of an air flow inserting apparatus for cables, which is an embodiment of the present invention. In FIG. 1, reference numeral 1 represents a cable; 2, a cable feed section; 3, a meandering detecting section; 4, an air flow supply section; 5, a tube; 6, feed rollers; 7, a primary seal; 8, a secondary seal; 9, a passage; 10, a recessed portion; 11, a compressed air supply port; and 12, 13, air flow.

In the conventional apparatus for blowing a cable, the air flow supply section 4 is directly connected to the feed section 2. On the other hand, in the present invention, the meandering detecting section 3 is provided between the feed section 2 and the air flow supply section 4. The meandering detecting section 3 has the recessed portion 10 formed in part of a wall surface of the straight passage 9. A detector is arranged on the recessed portion 10 to detect a cable that has entered into the depth of the recessed portion. In the present invention, the recessed portion 10 is provided as close to the rollers as possible.

Then, the cable 1 introduced into the apparatus through the secondary seal 8 is driven by the feed rollers 6, and the cable is fed into the tube 5 through the primary seal 7 and the air flow supply section 4. The air flow supply section 4 supplies the air flow 12 from the compressed air supply port 11 to the tube 5 so that the cable 1 is inserted into the tube 5 while riding on the air flow 13. The primary and secondary seal prevent the backflow of the air flow and the leak of the air flow from the apparatus so that the air flow 13 is merely directed into the tube 5.

Figure 2:
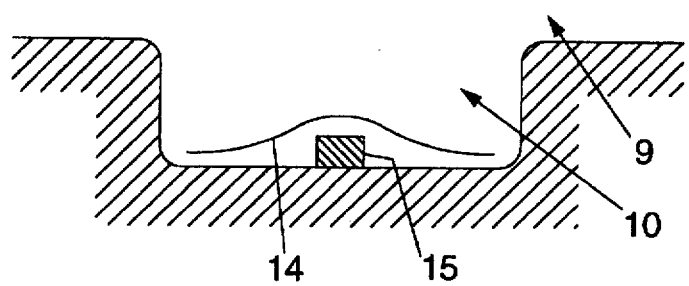
FIG. 2 is a diagram illustrative of an exemplary detector in FIG. 1.

FIG. 2 is a diagram illustrative of an exemplary detector. In FIG. 2, reference numeral 9 represents the passage; 10, the recessed portion; 14, a springlike electrode; and 15, a fixed electrode. When the cable 1 has entered into the recessed portion 10 to such a depth as to be detected, the springlike electrode 14 comes in contact with the fixed electrode 15, so that the meandering of the cable 1 can be detected. How the meandering of a cable is detected is not limited to the aforementioned mechanical switch, but various other known switch may be employed. For example, a light source and a light receiving section are arranged so as to confront each other at a predetermined depth in the recessed portion 10, and if a cable enters between the light source and the light receiving section, the cable shields a beam of light injected into the light receiving section. As a result, the meandering of the cable can be detected.

Further, the recessed portion 10 is designed to have a rectangular cross section. It is not essential that the recessed portion have an arcuate cross section as described with reference to FIG. 3, but the recessed portion may have a rectangular cross section to detect the meandering of a cable. It is proposed that the edges of the recessed portion be chamfered so that the cable passing along the recessed portion will not be damaged.

As regards the size of the recessed portion, considerations must be given to maintain a predetermined mechanical strength in the case of using a bundle of optical fibers as a cable. The recessed portion therefore must be formed with a radius of curvature of 30 mm or more. That is, the radius of the arc of the recessed portion described with reference to FIG. 4, the arc including three points, i.e., both edges and the meandering detecting point, must be 30 mm or more. Namely, when the distance between edges E1, E2 of the recessed portion is L and that the depth of a detecting point P of the recessed portion is D, the following formula have to be satisfied.

$$((L^2/4)+D^2)/2D \geq 30 \text{ (mm)}$$

To meet this requirement, it is proposed that a recessed portion having a length (L) of 32 mm and a detecting section depth (D) of 5 mm, or a length (L) of 25 mm and a depth (D) of 3 mm be arranged in a lateral surface of the passage. Other values may, of course, be selected based on the relational expression described with reference to FIG. 4.

Still further, with respect to a cable sheathed by foamed polyethylene, the radius-of-curvature requirement may, in some cases, be more strictly limited than the aforementioned cases, because if the radius of curvature with respect to the outer diameter of the cable is smaller than a predetermined value, the foamed polyethylene layer is plastically deformed. It has been verified through a study conducted by the inventors that the radius of curvature in this case must be 18 times the diameter of the cable. If the recessed portion is given a smaller radius of curvature than this value, the cable remains curved, impairing pressure-transporting performance.

A specific example of the embodiment described with reference to FIG. 1 will be described together with a comparative example. The tube employed in the example was formed by winding in bundlelike form a polyethylene tube having an inner diameter of 4.5 mm and a length of 300 m around a drum having a shell diameter of 1 m. Employed also was a cable that was formed by bundling a total of seven optical fiber conductors, each conductor having an outer diameter of 250 μm, in such a manner that one optical fiber conductor was arranged in the middle with the rest surrounding the optical fiber conductor in the middle, and by sheathing such bundle of optical fiber conductors with foamed polyethylene so that the outer diameter of the bundle became 2 mm. Further, dry air whose pressure was 3 kg/cm² is supplied as air flow.

The comparative example is distinguished from the air flow inserting apparatus described with reference to FIG. 1 in the following manner. A portion equivalent to the passage of the meandering detecting section of the latter was a hollow tube section having the same diameter as that of the tube excluding the recessed portion, and a transparent curved tube having a radius of 150 mm and a curving angle of 40° was employed in place of the tube adjacent to the exit of the air flow supply section of the latter. Using this comparative example, the insertion speed was controlled so as to allow the position of a cable to be visibly checked and thereby prevent the cable from meandering.

As a result, 20 m/min that is a speed at which the cable was initially inserted was reduced to a feed speed of 6 m/min when the cable was inserted 300 m, taking 22 minutes to insert all the length.

The example of the embodiment is distinguished from the apparatus described with reference to FIG. 1 in the following manner. An arcuate recessed portion having a radius of curvature of 30 mm and a distance between the edges (L) of 32 mm was provided at the meandering detecting section of the latter, and an optical detector was arranged at a depth (D) of 5 mm within the recessed portion.

A cable insertion test was conducted by controlling the insertion speed in the following way. The insertion speed was reduced when the entering of a cable into the optical detector section was detected, and the speed of the cable was increased when no cable was fed for one minute. As a result, the speed of the cable was 20 m/min at the insertion start, whereas the speed of the cable became 13 m/min when the cable was force-fed 300 m. That is, in the specific example, the total length of the cable could be force-fed at a higher cable speed than in the comparative example. It was verified in this case that the cable meandered within the tube adjacent to the entrance of the air flow inserting apparatus at a pitch of 12 to 15 cm that is not objectionable in terms of mechanical strength and force feeding performance. It took 13 minutes to insert the cable 300 m, which is a significant saving of time compared with the case of the comparative example.

Further, in the comparative example, the curving of the curved tube section takes up a length of 12 cm and a width of 7 cm. In addition, the tube is projected in such a direction as to move away from the axial line of the air flow inserting apparatus while being continuous to the curved tube section, and this means that a large working space is required. In contrast thereto, in the invention, what is required is to only arrange a meandering detecting section that is as small as several centimeters or so in the middle of the air flow inserting apparatus, and this makes the invention advantageous in terms of the working space.

Figure 6A:
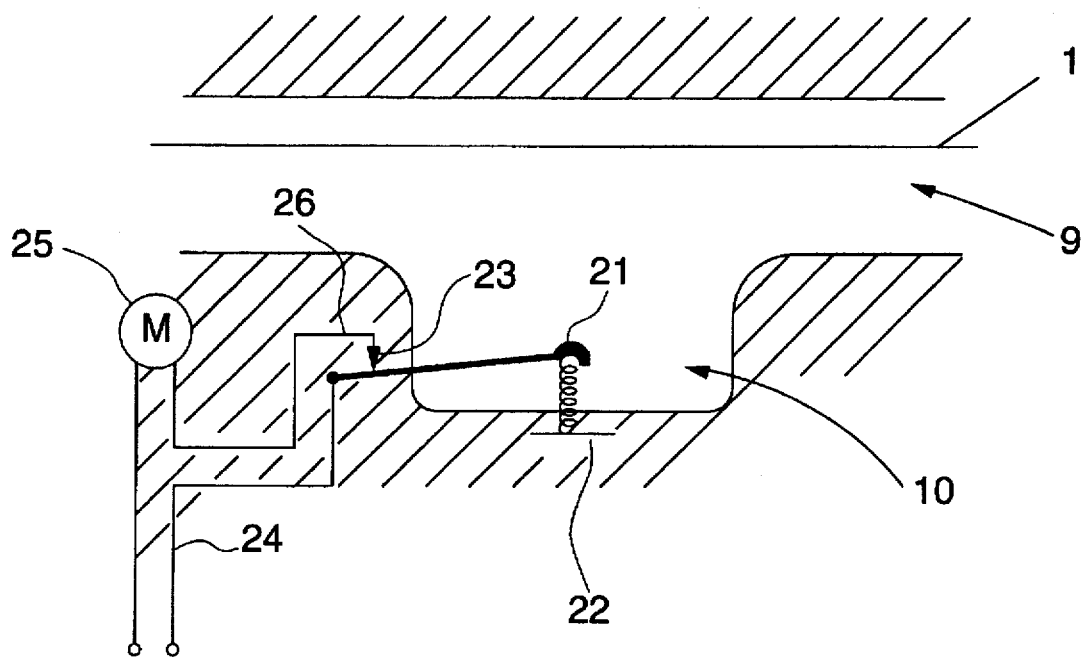
FIGS. 6A and 6B are diagrams illustrative of one embodiment of an electric wiring of the apparatus of the present invention for controlling a feed speed.
Figure 6B:
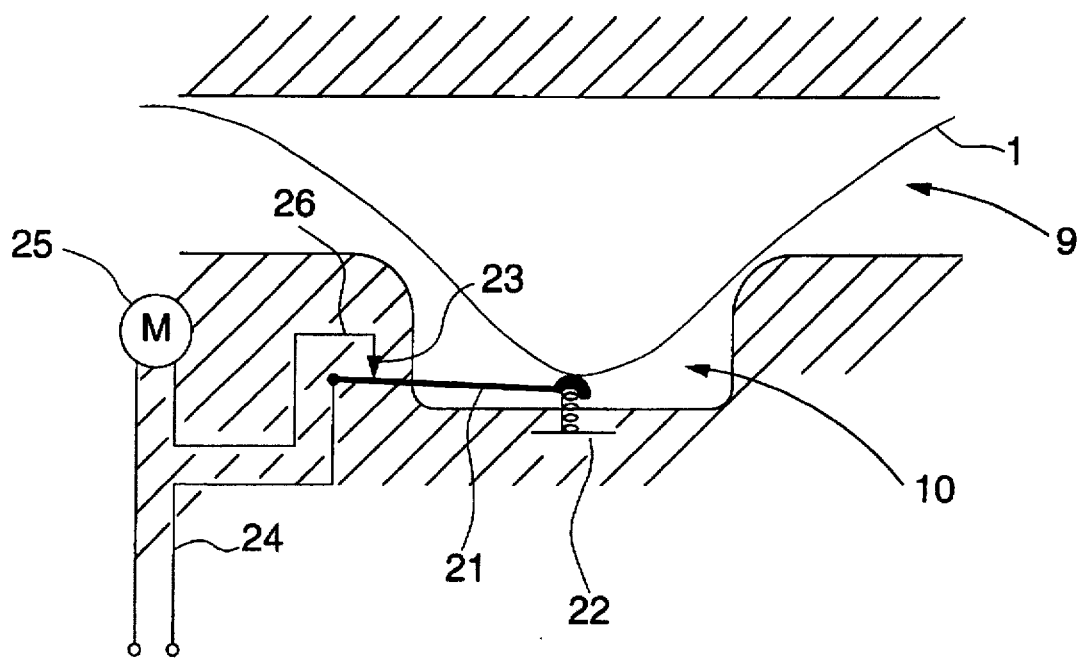

Further, FIGS. 6A and 6B shows one embodiment of an electric wiring of the apparatus of the present invention for controlling the feed speed of the feed rollers 6. In FIGS. 6A and 6B, reference numeral 21 represents a detecting electrode; 22, a return spring; 23, a contact point; 24, power lines; 25, a driving motor for driving the feed rollers 6; and 26, a fixed electrode. As shown in FIG. 6A, one of power lines 24 is introduced toward the recessed portion 10. The detecting electrode 21 is provided in the recessed portion 10. The detecting electrode 21 is mechanically moved when the cable 1 enters into the recessed portion 10. If the cable enters into the recessed portion 10 as shown in FIG. 6B, the contact point 23 between the detecting electrode 21 and the fixed electrode is separated so as to cut off the power line to stop the motor 25. The return spring 22 is provided at the bottom of the recessed portion 10 and under the top of the detecting electrode 21. When the entering of the cable 1 into the recess portion 10 is cancelled, the detecting electrode 21 is returned to the original position as shown in FIG. 6A by the force of the return spring 22 so that the detecting electrode 21 contacts with the fixed electrode 26 so as to supply the power to the driving motor 25 over again.

As described above, such a simple structure accomplishes the insertion of the cable with high reliability. In addition, a damping mechanism, an electrical delay circuit or the like may be provided so that the time delay is given to the contact point 23 to be contacted again. Accordingly, since the cable 1 is forwarded by the air flow, the insertion working is restarted under a condition that the meandering of the cable is completely cancelled.

While the case where a single recessed portion is arranged in the meandering detecting section has been described in the aforementioned embodiment, a plurality of recessed portions may be arranged. In such a case, a plurality of recessed portions, each having a different detection sensitivity, may be arranged, or a plurality of recessed portions, each having the same detection sensitivity, may be arranged at different circumferential positions. Further, the recessed portion may be arranged so as to surround the entire circumference of the passage with a plurality of detecting means arranged at a plurality of positions.

As is apparent from the foregoing, the invention is characterized as maintaining the air flow insertion speed of a cable at such a maximum level as not to damage the cable. Therefore, the cable laying time can be significantly curtailed compared with the conventional example. In addition, the function of allowing the insertion of a cable while preventing the meandering of the cable can be implemented with a small space, which makes the invention advantageous in downsizing the apparatus.

What is claimed is:
1. An apparatus for blowing a cable comprising:
   feeding means for feeding a cable into a tube;
   a meandering detection section provided adjacent to said feeding means, said meandering detection section having a straight passage for said cable passing therethrough, a recessed portion being arranged on a wall of said passage, and detecting means for detecting said cable meanderingly entering into said recessed portion;
   air flow supplying means for supplying an air flow into said passage and said tube; and
   prevention means for preventing the leak of the air flow from said apparatus.
2. An apparatus according to claim 1, further comprising control means for controlling a speed of said feeding means when said detecting means detects said cable meanderingly entering into said recessed portion.
3. An apparatus according to claim 1, further comprising stop means for stopping said feeding means when said detecting means detects said cable meanderingly entering into said recessed portion.
4. An apparatus according to claim 3, further comprising means for restarting said feeding means when said cable exits said recessed portion.
5. An apparatus according to claim 1, wherein a radius of an arc of the recessed portion, as defined by a distance between front and rear ends of the recessed portion and a depth of the recessed portion is larger than a radius of curvature allowed for the cable.
6. An apparatus according to claim 1, further comprising a plurality of said meandering detection sections.
7. An apparatus according to claim 5, wherein said recessed portion satisfies the following formula;

$$((L^2/4)+D^2)/2D \geq 30 \text{ (mm)}$$

where L is a distance between said front and rear ends of said recessed portion, and D is a depth of said recessed portion where said detecting means is provided.
8. A method for blowing a cable comprising:
   feeding a cable into a tube while supplying an air flow into said tube;
   arranging a straight passage having a recessed portion along a part of the tube into which the cable is inserted;
   detecting the entering of the cable into a meandering sensing point arranged within the recessed portion; and
   controlling a cable feed speed so that the cable is fed while maintaining a radius of curvature of the cable larger than a radius of an arc including front and rear ends of the recessed portion and the meandering detecting point.

* * * * *